Patented Apr. 30, 1929.

1,711,020

UNITED STATES PATENT OFFICE.

HANS HAHL, OF ELBERFELD, GERMANY, ASSIGNOR TO WINTHROP CHEMICAL COMPANY, INC., OF NEW YORK, N. Y., A CORPORATION OF NEW YORK.

BASIC ETHER OF RESORCINOL.

No Drawing. Application filed August 13, 1927, Serial No. 212,841, and in Germany September 20, 1926.

The present invention relates to new basic ethers of resorcinol, more particularly to compounds of the general formula:

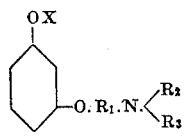

wherein X, $R_1$, $R_2$ and $R_3$ stand for alkyl groups.

These compounds are obtainable according to the usual processes for the manufacture of alkyl ethers. Preferably a basic alkyl-haloganide, as for instance, diethylamino-ethylchloride, may be caused to react with a mono-alkyl ether of resorcinol in the presence of an alkaline acting agent.

The new products possess a strong contracting action on blood vessels and a labor pain exciting action. They are generally colorless or slightly yellow colored oils of basic odor which can be distilled in a vacuum without decomposition, being difficultly soluble in water and easily soluble in acids.

The following examples serve to illustrate my invention, all parts being by weight:

*Example 1.*—20 parts sodium are dissolved in 400 parts alcohol and treated with 100 parts resorcinol-mono-methyl ether. The reaction mixture is heated for about two hours to about 100–120° C., with 125 parts diethyl-amino-ethylchloride. After distilling off the alcohol the residue is treated with water, the resulting oil separated, dried and fractionated.

The compound thus obtained boils as a colorless liquid at 160–166° C. under a pressure of 13 mm. It gives with hydrochloric acid a crystalline salt which melts at 138–140° C.

*Example 2.*—40 parts resorcinol-monomethyl ether are treated with a solution of 8 parts sodium in 300 parts alcohol and heated for about three hours to about 80–100° C. after the addition of 60 parts α-dimethyl-amino-β-methyl-γ-chlorobutane of the formula:

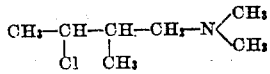

After distilling off the alcohol the new basic ether is separated with water and fractionated after drying. It distills at 170–172° C. (12 mm. pressure) as a colorless oil and possesses the following constitution:

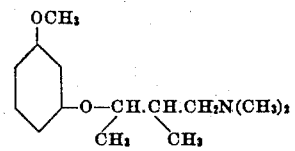

*Example 3.*—3.5 parts sodium are dissolved in 100 parts alcohol and heated together with 20 parts resorcinol-mono-ethyl ether and 20 parts diethyl-amino-ethylchloride for about five hours to about 100–110° C. When the reaction is complete the product is worked up as described in Example 1. The new base distils at 171–179° C. under 12 mm. pressure as a yellow liquid which is easily soluble in acids.

Having now particularly described and ascertained the nature of my said invention and in what manner the same is to be performed I declare that what I claim is:—

1. As new products the compounds of the general formula:

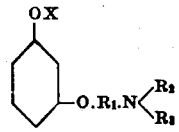

wherein X, $R_1$, $R_2$ and $R_3$ stand for alkyl groups.

2. As new products the compounds of the general formula:

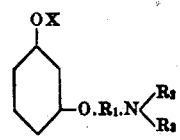

wherein X, $R_2$ and $R_3$ stand for methyl- or ethyl-groups and $R_1$ for an alkyl group containing at least two but not more than five carbon atoms, which are slightly yellow colored oils of basic odor, difficultly soluble in water, easily soluble in acids, possessing a strong contracting action on blood vessels and labor pain exciting action.

3. As new products the compounds of the general formula:

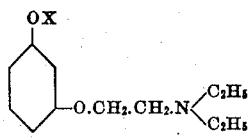

wherein X stands for a methyl-. or ethyl-group, which are slightly yellow colored oils of basic odor, difficultly soluble in water, easily soluble in acids, possessing a strong contracting action on blood vessels and labor pain exciting action.

4. As a new product the compound of the general formula:

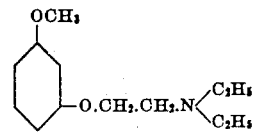

forming with hydrochloric acid a crystalline salt melting at 138 to 140° C. and possessing a strong contracting action on blood vessels and labor pain exciting action.

In testimony whereof I have hereunto set my hand.

HANS HAHL.